(12) United States Patent
Hernando et al.

(10) Patent No.: US 6,922,140 B2
(45) Date of Patent: Jul. 26, 2005

(54) SYSTEM FOR MONITORING THE PRESSURE OF TIRES OF A MOTOR VEHICLE

(75) Inventors: Serge Hernando, Cergy (FR); Thierry Pinard, Garches (FR); Jean-Pierre Peghaire, Argenteuil (FR)

(73) Assignee: Johnson Controls Technology Company, Plymouth, MI (US)

( * ) Notice: Subject to any disclaimer, the term of this patent is extended or adjusted under 35 U.S.C. 154(b) by 24 days.

(21) Appl. No.: 10/405,397

(22) Filed: Apr. 2, 2003

(65) Prior Publication Data

US 2004/0066290 A1 Apr. 8, 2004

(51) Int. Cl.[7] .............................................. B60C 23/00
(52) U.S. Cl. ...................................... 340/444; 340/447
(58) Field of Search ................................. 340/442, 444, 340/446, 447, 445; 73/146.2, 146.4, 146.8; 342/70, 71, 72; 152/152.1

(56) References Cited

U.S. PATENT DOCUMENTS

| | | | |
|---|---|---|---|
| 5,661,651 A | 8/1997 | Geschke et al. ............... 701/88 |
| 6,046,672 A * | 4/2000 | Pearman ....................... 340/447 |
| 6,218,937 B1 | 4/2001 | Delaporte .................... 340/447 |
| 6,259,361 B1 | 7/2001 | Robillard et al. ........... 340/447 |
| 6,420,996 B1 * | 7/2002 | Stopczynski et al. ......... 342/70 |
| 6,435,020 B1 | 8/2002 | Oldenettel et al. ......... 73/146.4 |
| 6,662,642 B2 * | 12/2003 | Breed et al. .................. 73/146 |
| 6,690,271 B2 * | 2/2004 | Fischer et al. .............. 340/447 |

* cited by examiner

Primary Examiner—Van T. Trieu
(74) Attorney, Agent, or Firm—Foley & Lardner LLP

(57) ABSTRACT

According to one exemplary embodiment, a system for monitoring the pressure of tires of a motor vehicle with location of the wheels comprises a monitoring element and a pressure sensor. Each pressure sensor is associated with a transmitter with which it transmits to the monitoring element a radio signal comprising sensor identification data. The system comprises a means for determining the phase shift between two radio signals transmitted at two distinct times for each wheel. The system further comprises a means for determining the rotation angle, modulo $2\pi$, traveled by each of the wheels between the two times. The system further comprises a means for comparison between the phase shifts and the rotation angles.

13 Claims, 5 Drawing Sheets

SYSTEM FOR MONITORING THE PRESSURE OF TIRES OF A MOTOR VEHICLE

BACKGROUND

The present invention concerns systems for monitoring the pressure of tires of motor vehicles, comprising, on each wheel, a pressure sensor and a transmitter for transmitting the pressure to a monitoring element.

In these systems, which are referred to in the art as tire pressure monitoring systems (TPMS), the signals transmitted by the pressure sensors include data which allow them to be identified. If the wheels of a vehicle were never changed, a simple initial entry, at the factory, of the allocation between signals and wheels would allow a determination of the location of the sensors with respect to the vehicle's chassis. This determination is necessary in order to locate defective tires.

Since the wheels of a vehicle are, however, occasionally put in different positions and rotated, the problem still exists of locating the wheel on which the sensor is mounted.

Some solutions have already been proposed. In particular, the Applicant describes in French Patent Application FR 0 116 368 a system for monitoring tire pressure in which rotation speeds calculated on the basis of data supplied by the sensors are compared to those determined by fixed wheel rotation speed sensors whose location is known. The latter are, in particular, antilock braking system (ABS) sensors. The ABS uses a separate sensor for each wheel that provides its angular position in the form of pulses. The latter correspond to distances traveled by the wheel (on the order of a few centimeters).

It is known that the wheels of a vehicle do not all rotate at the same speed. A difference in the pressure of the tires, for example, or even in the amount of wear on the tread, results in a difference in the wheels' diameter and thus in their rotation speed. Vehicle dynamics, load distribution, and temperature are also factors influencing the rotation speeds of wheels with respect to one another.

These deviations are thus utilized in order to make this determination. To that end, a calculation is made of the difference between the speed of each fixed sensor and that calculated on the basis of data supplied by the pressure sensors. It is thus possible to associate with each of the fixed sensors that pressure sensor having the lowest calculated speed deviation. This system is advantageous in that it uses existing means, i.e. at no extra cost. It has also proven to be reliable, given the quality of the fixed sensors of the antilock braking system.

It is not uncommon, however, for the measured speeds to be very similar to one another. Calculation convergence is then slow, and the system's reaction time is relatively long (as long as 60 minutes). The pressure sensors are powered by batteries located inside the tires. It is desirable to limit their energy consumption as much as possible in order to increase the product's service life. A limitation of the sensors' transmission time is therefore advantageous.

The Applicant has thus established as its object that of improving the means of locating wheels in a tire pressure monitoring system using a means with which the transmission time of the sensors can be reduced.

SUMMARY

According to one exemplary embodiment, a system for monitoring the pressure of tires of a motor vehicle with location of the wheels comprises a monitoring element and a pressure sensor. Each pressure sensor is associated with a transmitter with which it transmits to the monitoring element a radio signal comprising sensor identification data. The system comprises a means for determining the phase shift between two radio signals transmitted at two distinct times for each wheel. The system further comprises a means for determining the rotation angle, modulo $2\pi$, traveled by each of the wheels between the two times. The system further comprises a means for comparison between the phase shifts and the rotation angles.

According to another exemplary embodiment, a method of identifying the locations of wheels in a vehicle comprises determining phase shifts between radio frequency signals transmitted at a plurality of times from each wheel and determining rotation angles traveled by each wheel at the plurality of times. The method further comprises identifying the locations of the wheels based on the phase shifts and the rotation angles.

According to another exemplary embodiment, a method of identifying the locations of wheels on a vehicle comprises, for each of a plurality of wheels, receiving radio frequency signal having a periodic modulation at first and second times and determining a phase shift in a periodic modulation between the first and second times, and receiving a speed signal from a wheel speed sensor. The method further comprises identifying the locations of the wheels on the vehicle based on the phase shifts and the speed signals.

DETAILED DESCRIPTION OF EXEMPLARY EMBODIMENTS

According to one exemplary embodiment, a system for monitoring the pressure of tires of a motor vehicle with location of the wheels, comprises:

a monitoring element,
one pressure sensor per wheel, associated with a transmitter with which it transmits to the monitoring element a radio signal comprising sensor identification data, is characterized in that it comprises:
a means for determining the phase shift between two radio signals transmitted at two distinct times T1 and T2 for each wheel,
a means for determining the rotation angle modulo $2\pi$ (pi) traveled by each of the wheels between times T1 and T2, and
a means for comparison between the phase shifts and the rotation angles for each of the wheels.

For the means for determining the rotation angle traveled, it is preferable to use rotation speed sensors on each of the wheels, in particular those of an antilock braking system.

The modulation envelope of the signal furnished by the radio transmitter accommodated in the wheel is a periodic signal whose period is a function of the rotation of the wheels. In addition, the phase shift between signals measured at two given times is an indication of the distance traveled by the wheel modulo its circumference. A means is thus available for comparison with the measurement of distance traveled, deduced from a means (such as the ABS) for determining the distance traveled by each of the wheels, which can be expressed as a rotation angle.

In the comparison of distances or angles traveled between two specific times, the calculation accuracy can be increased as desired. This accuracy is a function of the time period separating the two times. Control of this accuracy is better than with the previous system, in which a speed comparison is used. The result is the time required to locate the wheels can be both much more rapid and more reliable.

Figure 1:
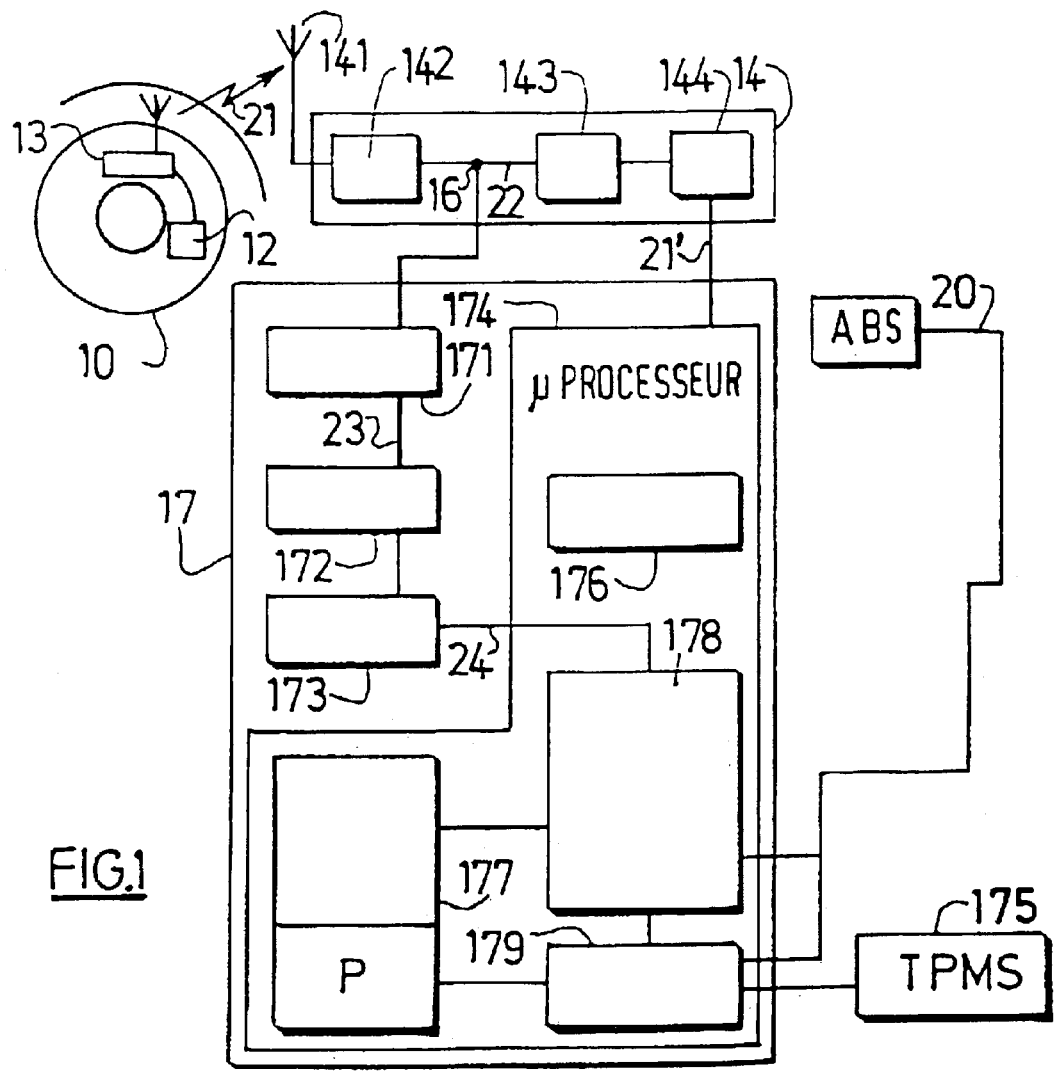
FIG. 1 is a block diagram of the system according to the present invention.

As is evident from FIG. 1, an assemblage having a pressure sensor 12 linked to a transmitter 13 is provided for each wheel 10. A fixed receiver 14 mounted on the chassis receives signal 21 transmitted by transmitters 13.

Receiver 14 comprises, in series, a receiving antenna 141; a demodulator 142 supplying an analog signal 22; a filter 143; and an electronic circuit 144 for processing the tire pressure data, which delivers data 21' to a monitoring element 17. Fixed receiver 14 allows radio signal 21 to be converted into digital data 21' containing the pressure of the tire and its identification.

A shunt 16, e.g. at the output of demodulator 142, feeds into monitoring element 17. The latter comprises, in series, a filtering circuit 171, e.g. an RC filter, supplying a filtered signal 23; a sampler/blocker 172; and an analog/digital converter 173 which transmits signal 24 to microprocessor 174 of the monitoring element. Microprocessor 174 has program memories 178, 179, a data memory 177, and a clock 176.

At its output, the monitoring element delivers pressure data, identification data, and location data to a TPMS component 175 for managing those data. In addition, element 17 receives data 20 derived from ABS sensors regarding wheel rotation speed and wheel location.

The program of memory 178 comprises at least one step of calculating the phase shift of the pressure signals, and the program of memory 179 comprises at least one step of comparing the wheel angles. The wheel angle is an indication of the distance traveled by the wheel.

Signal 21 delivered by sensor 12 and transmitted by its transmitter 13 undergoes a parasitic modulation, resulting in particular from bodywork 10 of the vehicle, before being received by receiver 14.

By way of shunt 16, signal 22 is also filtered by filter 171 of monitoring element 17.

Upon emerging from filter 171, signal 23 is sampled and digitized at a sampling frequency fe by sampler 172, which "freezes" the analog values at regular intervals, and by analog/digital converter 173 which supplies digital samples of the signal at output 24.

Microprocessor 174 transfers control to the program of memory 178, which acquires the digital samples for a predetermined time period t, for example 200 ms, and saves the samples in memory 177. In particular, and in accordance with the invention, it stores in memory 177 samples corresponding to two specific times T1 and T2 spaced, for example, six seconds apart.

Figure 2:
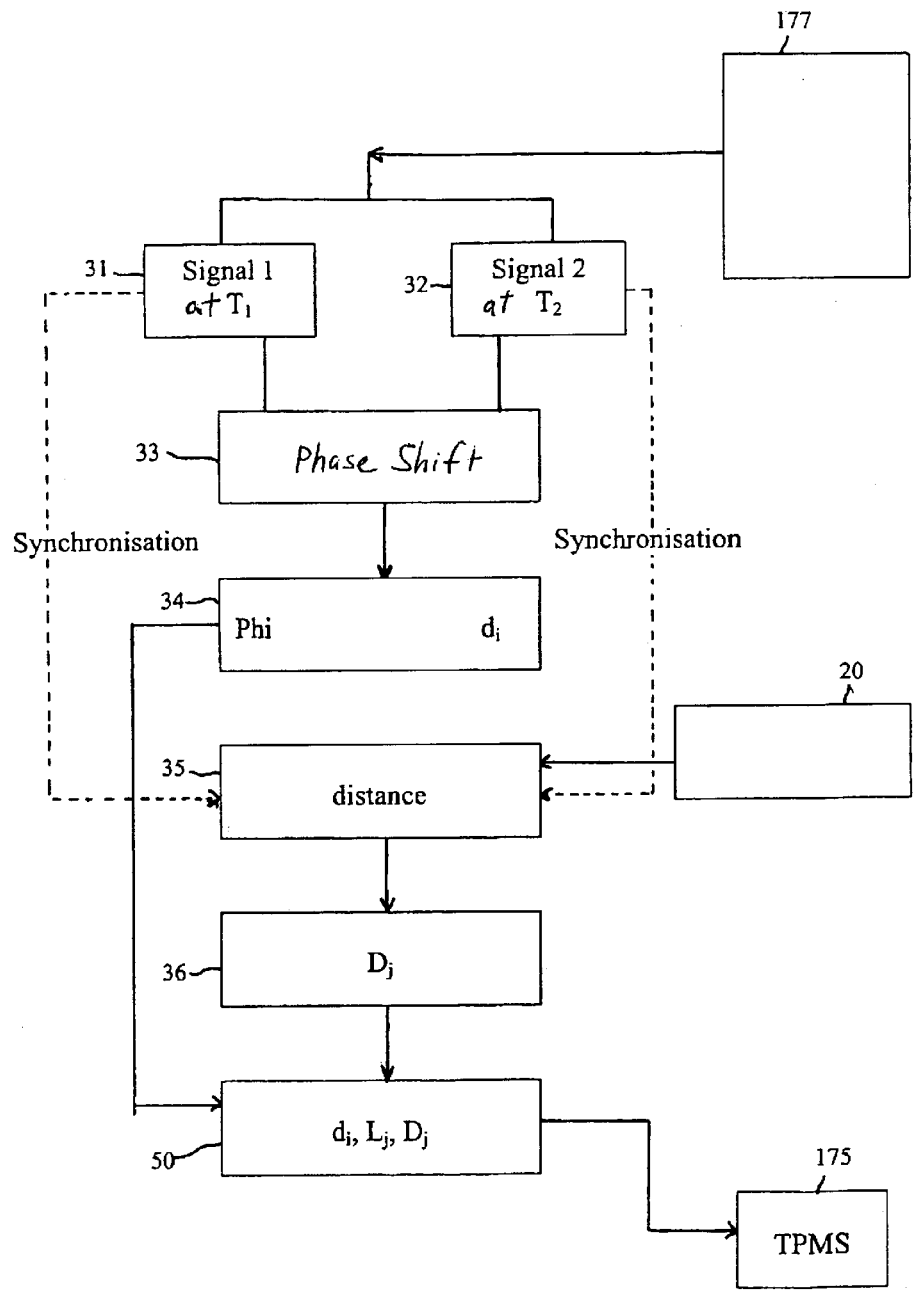
FIG. 2 is a flow chart for the wheel location method.

The flow chart of FIG. 2 shows the various steps of the programs of memories 178, 179. Once the data corresponding to the periodic signals of times T1 and T2 have been acquired, the program extracts them at 31 and 32 and calculates their phase shift at 33. Between times T1 and T2, the wheels have performed a certain number of complete revolutions plus a fraction of a revolution. The phase shift between the two signals transmitted by the pressure sensors is an indication of that fraction of a revolution. That fraction of a revolution can be expressed as the wheel angle (d), calculated at 34, at the sensors of each wheel.

The method for determining the phase shift of the radio signals between times T1 and T2 is based on the following principles:

The following are identified from the two signals:
one complete period, in the range [T1, T1+t1], of the radio-frequency reception level S1[T1, T1+t1];
one complete period, in the range [T2, T2+t2], of the radio-frequency reception level S2[T2, T2+t2].

These signals occur in the form of tables of values extracted from memory 177. Times t1 and t2 represent one period of the signal, i.e. corresponding to one wheel revolution, and these values are generally different since they correspond to times at which the vehicle's speed may be different; t1 and t2 are determined, for example, using the method described in the Applicant's patent FR 01 14 140, which is hereby incorporated by reference. The method is also described in exemplary form with reference to FIGS. 3–6 herein.

Proceeding from these value tables, the operations comprise:
a time normalization, which consists in bringing the two tables of points to an identical dimension S1_normalized and S2_normalized;
calculation of a correlation function in order to determine the phase shift between the two signals:

$$Phi = \text{Min} \sum_{\theta=0}^{\theta=2\pi} |S1\_\text{normalized}\ (\theta) - S2\_\text{normalized}\ (\theta + \phi)|$$

Note that the distance P traveled, modulo one wheel revolution, is related to the angle Phi by the equation $$P = R_{wheel} * Phi\ (R_{wheel} = \text{nominal value of wheel radius}).$$

Independently of the calculation of the wheel angle based on the radio signals, the program proceeds (at 35) to calculate the distance traveled by the wheels based on the data received from the ABS sensors at times T1 and T2. At 36, the corresponding wheel rotation angles are calculated on the basis of their radius. Note that the measurement accuracy provided by the ABS sensors depends on the number of pulses per revolution. One known system, for example, counts 48 pulses per revolution. The accuracy on a wheel 0.3 m in diameter is therefore 0.039 m.

The program module of memory 179 performs angle comparisons in order to deduce therefrom the location of the wheels' pressure sensors.

At 50, the wheel angles ($d_i$) of the i-referenced wheels are compared to the angles ($D_j$) of the j-referenced wheels supplied by the speed sensors of ABS device 20. The location ($L_j$) for each angle ($D_j$) is also known.

The comparisons between the ($d_i$) wheel angles and the ($D_j$) angles from sensors j of the ABS are performed as follows:

The angles ($d_i$) of wheels i on the one hand, and the angles ($D_j$) of sensors j on the other hand, are ranked e.g. in ascending order and continuously, and pairs Cij of angles ($d_i$, $D_j$) are created, the indices being such that in the ranking of angles d, ($d_i$) has the same rank as ($D_j$) in the ranking of angles d. An association is then made between the pressure sensor of wheel i with identifier Idi corresponding to the angle ($d_j$) and the location ($L_j$) of ABS angle sensor j that yielded ($D_j$) when the deviation between values ($D_i$) and ($D_j$) is minimal.

To demonstrate the usefulness of the solution, a simulation was performed.

This relates to two wheels proceeding over a period of six seconds with any speed profile over that period.

The hypotheses were as follows:

| | |
|---|---|
| Wheel radius: | 0.3 m |
| Difference in radius between the two wheels: | 0.05% |
| Number of ABS pulses per revolution: | 48 |

Between two times T1 and T2 six seconds apart, a determination was made of the phase shift D1 (expressed here in meters) on the first wheel taken as the reference wheel, and the phase shift D2 (expressed in meters) on the second wheel having a 0.05% radius deviation compared to the first wheel. These values were assumed to correspond to those that would be obtained from fixed ABS speed sensors. This is the distance traveled by the wheel modulo the wheel diameter.

For the same six-second interval, the phase shift d1 was determined on the first wheel based on a simulated radio signal, e.g. by way of a sine curve. The phase shift was calculated based on a 200-ms location grid at T1, then a second 200-ms location grid at T2, six seconds later.

The phase shift distances were calculated (in meters) for several vehicle speed values. These are summarized in the table below.

| Speed (km/h) | D1 (m) | d1 (m) | D2 (m) | \|D1 − d1\| (m) | \|D2 − d2\| (m) | Speed deviation (km/h) |
|---|---|---|---|---|---|---|
| 40 | 1.0305 | 1.0308 | 0.9961 | 0.0003 | 0.0347 | 0.02 |
| 60 | 1.5457 | 1.5561 | 1.4941 | 0.0153 | 0.0669 | 0.03 |
| 80 | 0.176 | 0.1767 | 0.1072 | 0.0007 | 0.0695 | 0.04 |
| 100 | 0.6912 | 0.7069 | 0.6052 | 0.0157 | 0.1017 | 0.05 |
| 120 | 1.2065 | 1.2075 | 1.1032 | 0.001 | 0.1043 | 0.06 |

It is evident that the resulting minimum value is located in the "|D1−d1|" column, which in fact refers to the wheel referenced 1.

It is also apparent from this simulation that the method allows a distinction to be made between two wheels having a radius difference as small as 0.05%. At 40 km/h the deviation between these two wheels is 0.0347 m; this is at the limit of ABS measurement accuracy, which is 0.0393. At 60 km/h it is much greater.

Priority application FR 02-11843, filed Sep. 25, 2002, including the specification, drawings, claims, and abstract is incorporated herein by reference in its entirety.

The system for measuring the rotation speed of a wheel 11 will now be described.

Figure 3:
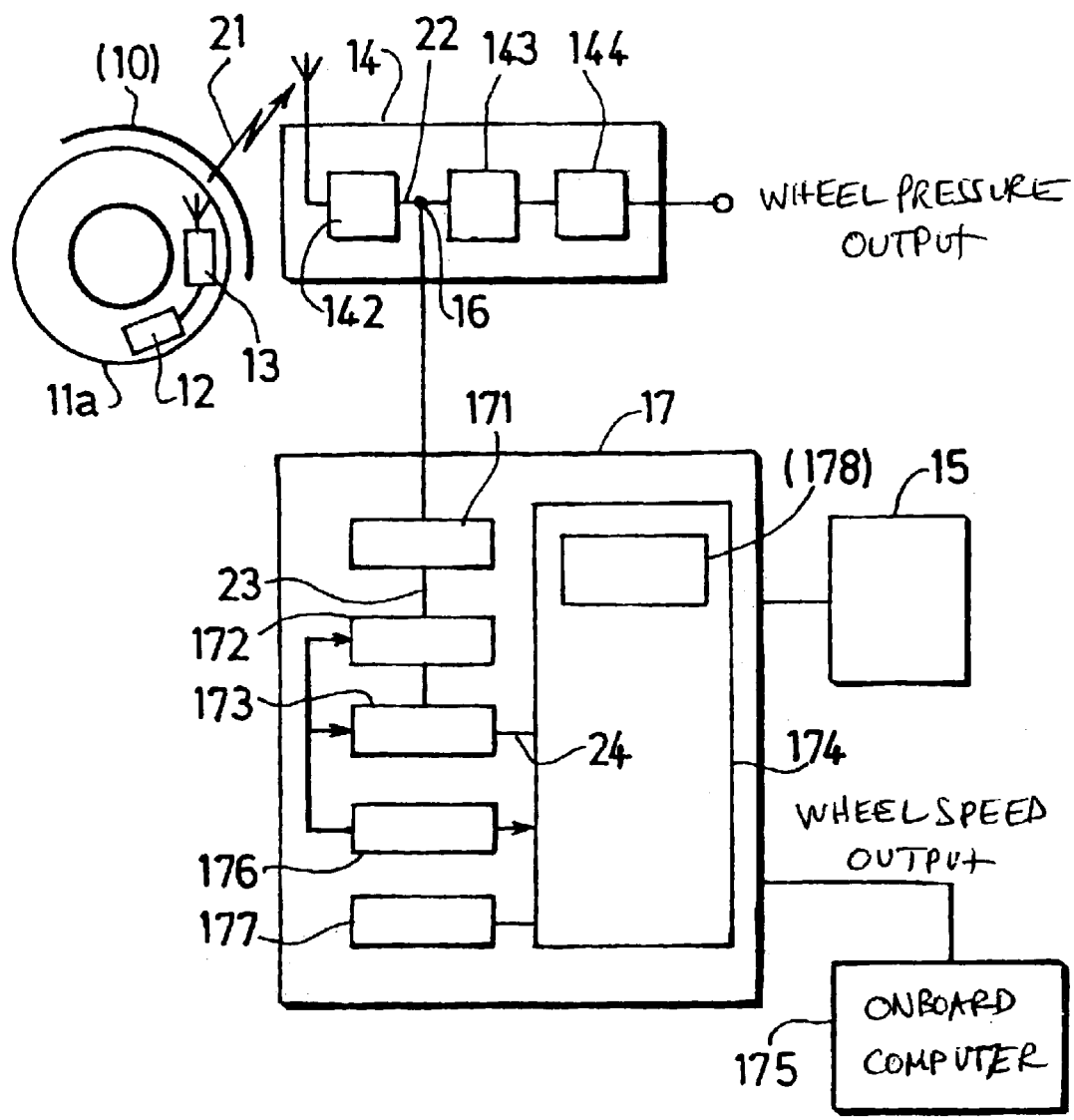
FIG. 3 is a block diagram of the system according to an exemplary embodiment.

Referring to FIG. 3, it comprises an assemblage having a pressure sensor 12 and its transmitter 13 mounted on wheel 11, as well as a fixed receiver 14 intended to process signal 21 emitted by transmitter 13.

Fixed receiver 14 ordinarily comprises, in series, a receiving antenna 141, a demodulator 142 supplying an analog signal 22 stripped of its carrier, a filter 143, and an electronic system 144 for processing the tire pressure data.

With this apparatus, the radio signals can be converted into digital signals and the tire pressure can be calculated.

The system has, in this case downstream from demodulator 142, a branching point 16 for the signal received by the fixed receiver, which delivers the signal to processing means 17 for extracting the signal modulation envelope and calculating the wheel rotation speed.

Here the signal processing means comprise, in series, the following means:

a filtering means 171 for extracting modulation envelope 23 from the signal;

acquisition means 172, 173 for sampling and digitizing said envelope 23;

a calculation processor 174, 178 for determining the period of said envelope.

The system furthermore comprises at least one clock 176 connected to the acquisition means and to the processor, which in turn is connected to at least one sample recording memory 177 and to vehicle speedometer 15.

In the example under consideration, the system also uses the vehicle's onboard speedometer 15. This could also be the odometer, since the circumferential length of the wheels is available.

Figure 4:
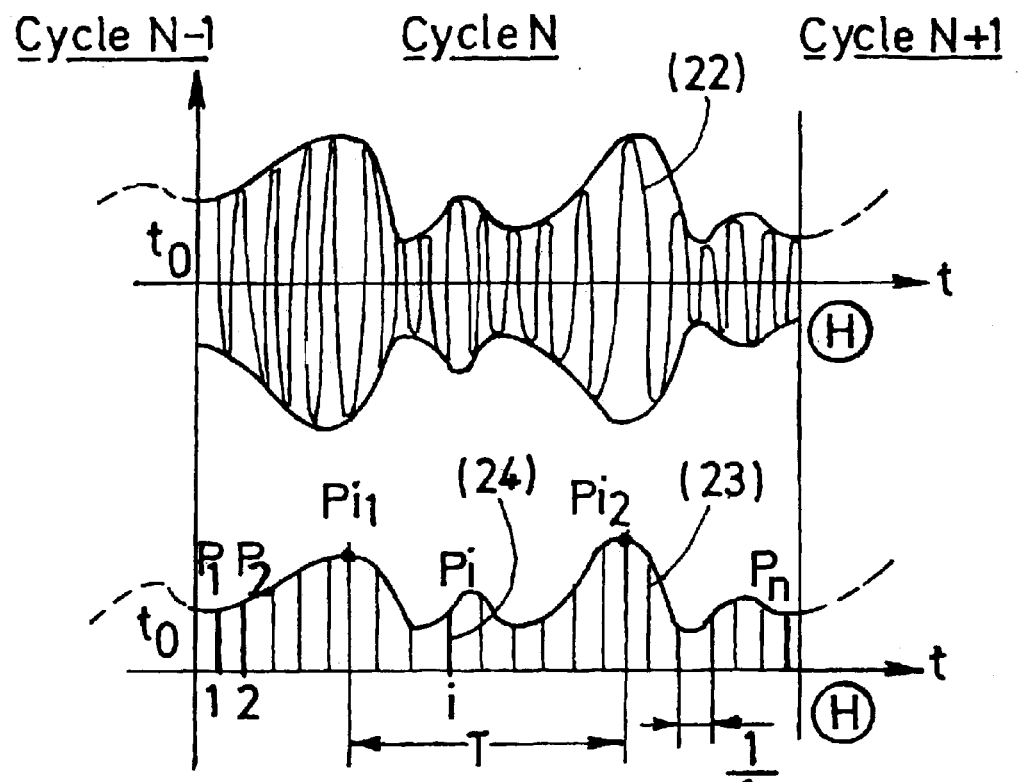
FIG. 4 shows a typical signal furnished by a pressure sensor, and its modulation envelope.
Figure 6:
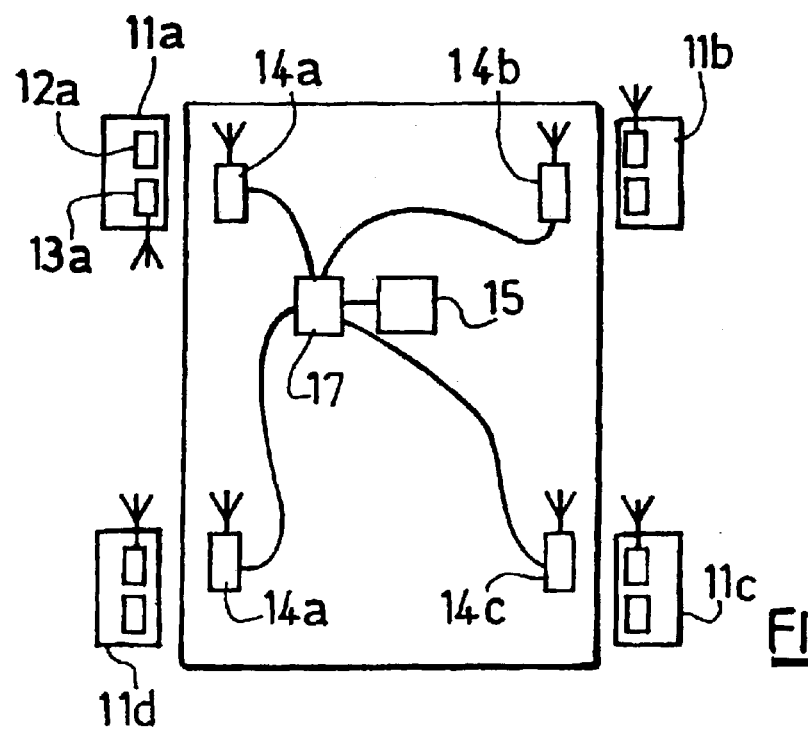
FIG. 6. illustrates implementation of the method at the four wheels of a vehicle.

Referring to FIG. 4, the method consists in cyclically processing the signal proceeding from the pressure sensor transmitter, the cycle comprising an observation time span Θ during which substantially identical and successive amplitude maxima $P_{i1}$, $P_{i2}$, and the time spans separating them, are detected.

These time spans correspond to the desired period T, from which the rotation speed will be deduced.

To obtain this result, signal 22 is picked up at the output of demodulator 142 and is subjected to lowpass filtration in filter 143 in order to isolate the envelope.

This can be accomplished by an analog filtering method, by selecting a filter cutoff frequency Fc that is slightly greater than the maximum wheel rotation frequency.

The filtered signal is then sampled at a previously determined sampling frequency fe. In accordance with a well-known signal processing rule, this frequency is at least twice the cutoff frequency Fc.

Observation time span Θ is determined based on information regarding the vehicle speed available elsewhere, for example as supplied by onboard instruments (speedometer, odometer).

Specifically, if U is the latter speed in meters per second, and c is the length in meters of the wheel circumference, an estimate of wheel rotation period T is provided by the ratio c/U. With this estimate it is possible to select observation time span Θ so that it contains at least the two desired maxima:

$$\Theta = (2c)/U$$

After a certain number of cycles, observation time span Θ can be optimized to a lower value—based on the signal's history and a knowledge of the vehicle's speed and the location of the maximum within the period—to a value that is close to T but always greater, so that the periodic signal whose period is to be determined is entirely located therein.

Once this difficulty has been eliminated, beginning at a time t0 and for the observation time period thus determined, the n sampled values $P_1, P_2, \ldots, P_i, \ldots P_n$ thereby obtained are sorted in, for example, chronological order 1, 2, ..., i, ... n. The number n of sorted values is such that $$n = fe * \Theta.$$

The sorted signal is then searched for two successive substantially identical maxima $P_{i1}$, and $P_{i2}$, whose values correspond to the maxima of both of the two successive periods, and their sort locations i1 and i2 in said recording time span Θ is noted.

The desired period is deduced therefrom:

$$T=(i2-i1)/fe.$$

Lastly, the wheel rotation speed between time t0 and time t0+Θ is obtained using one of the aforementioned formulae.

Successive rotation speeds may be obtained by simply repeating the cycle just described. This yields a sample of the instantaneous wheel rotation speed at a specific sampling frequency Fe.

Since one cycle contains at least one observation time span to which, in theory, a processing time span must be added, the cycle time-span should be a longer—and, in principle, fixed—time span.

The method provides a continuous measurement of the wheel rotation speed at a frequency $$Fe=1/\Theta.$$

This frequency is variable and depends on the vehicle's speed. The higher that speed, the greater the frequency will be. The higher the vehicle's speed, therefore, the more quickly a wheel rotation speed will be available.

Returning to the embodiment of FIG. 3, signal 21 emitted by transmitter 13 experiences a parasitic modulation due principally to bodywork 10, before being received by receiver 14 and processed therein to yield the tire pressure. Signal 22 at the output of demodulator 142 is therefore filtered by receiver filter 143 for normal pressure data processing requirements.

Signal 22 is also filtered by filter 171 of signal processing means 17, for example by an RC filter.

At the output of filter 171, signal 23 is continuously sampled and digitized at frequency fe by a sampler/blocker 172, which freezes the analog values at regular intervals at frequency fe, and by an analog/digital converter 173 which supplies at output 24 digital samples Pi of the signal whose period is to be determined. These means perform these operations using, in particular, clock 176, under the control of processor 174.

Figure 5:
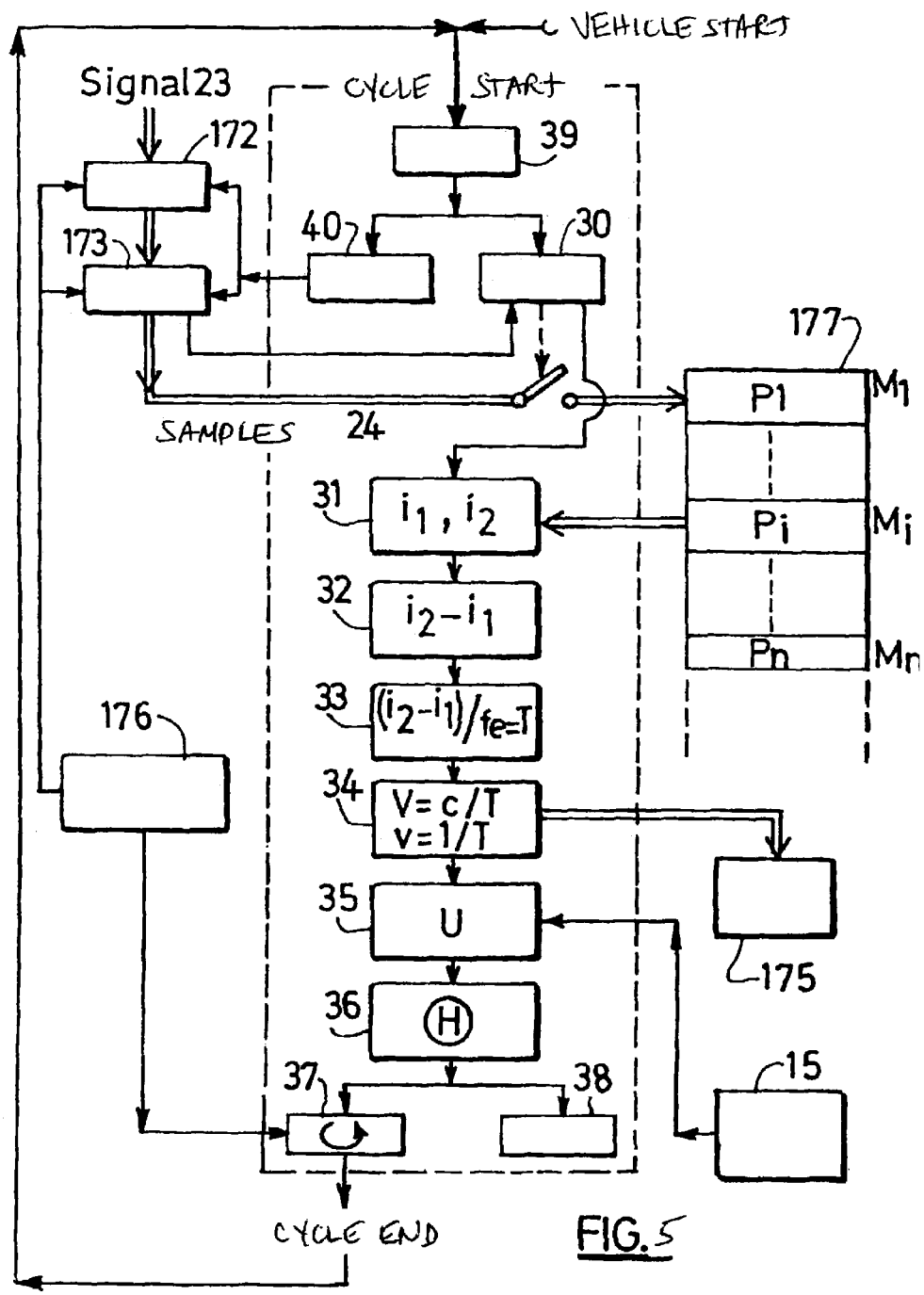
FIG. 5 is a flow chart of the method for determining the rotation speed of a wheel.

Referring to FIG. 5, processing 174 transmits control to the program of memory 178, which acquires and sorts (30) said samples Pi into memory 177 from $P_1$ to $P_n$ and respectively from memory $M_1$ to memory $M_n$.

The program, or the method, then calculates the wheel rotation speed, which it transmits to onboard computer 175. To do so, at this stage it performs the following operations in succession:

searching memory 177 (31) for sort addresses i1 and i2 of the two greatest values Pi;

calculating (32, 33) the time span separating those two locations, i.e. the modulation envelope period T=(i2−i1)/fe;

calculating (34) linear rotation speed V=c/T or angular rotation speed v=1/T and providing those speeds to user means 175;

acquiring (35) vehicle speed U;

calculating (36) a new observation time span Θ=(2c)/U and a new number n of samples to be acquired in accordance with the vehicle's speed;

initializing (38) the next cycle, which involves updating the previously calculated time span Θ and number n and erasing memory 177;

waiting (37), if applicable, for the starting time of the next cycle t0+(N+1)Θ;

initiating the next cycle (39) then checking (40) the sampler/blocker and converter 172, 173.

It is not necessary to wait for the current cycle to end if calculation completion corresponds to the end of the current cycle. Such is the case if the observation and sample acquisition operations and the speed calculation operations are consecutive.

Such is not the case for a more developed version in which the wheel rotation speed determination operations performed during cycle N correspond to samples observed and acquired during cycle N−1.

The reason is that in this more developed version, the speed calculation in cycle N corresponds to observation of the signal in cycle N−1. Thus, during the time elapsed between t0+N*Θ and t0+(N+1)*Θ, the microprocessor, having acquired the n samples, calculates the rotation speed for the wheel that was activated during the time period [t0 +(N−1)*Θ . . . t0+N*Θ].

In the most common situation, having one measurement system for all of a vehicle's wheels (FIG. 4) and therefore comprising a group of tire pressure sensors, there are shared signal processing means (17) for processing all four wheels.

In the case of a tire pressure measurement system comprising four receptors of the (14a) type, for example, it is sufficient to quadruple the lowpass filter and to multiplex the inputs to the sample/blocker and the analog/digital converter. This correspondingly reduces the amount of equipment required.

What is claimed is:

1. A system for monitoring the pressure of tires of a motor vehicle with location of the wheels, comprising a monitoring element, one pressure sensor per wheel i associated with a transmitter with which it transmits to the monitoring element a radio signal comprising sensor identification data, the system comprising:

a means for determining the phase shift (di) between two radio signals transmitted at two distinct times (T1 and T2) for each wheel i;

a means for determining the rotation angle (Dj), modulo 2π, traveled by each of the wheels j between the two times (T1 and T2);

a means for comparison between the phase shifts (di) and the rotation angles (Dj), including determining first wheel angles based on the phase shifts and second wheel angles based on the rotation angles, and ranking the first wheel angles and second wheel angles in order to create pairs of wheel angles; and a means for identify the location of the wheels based on the ranking.

2. The system as defined in claim 1, wherein the means for determining the rotation angle traveled by each wheel comprise means for determining the speed of each wheel.

3. The system as defined in claim 2, wherein the means are speed sensors of the vehicle's antilock braking system.

4. The system as defined in claim 1, wherein the monitoring element comprises a means for storing the digital data at the two times (T1 and T2) corresponding to the radio signals.

5. A method of identifying the locations of wheels on a vehicle, comprising:

determining phase shifts between radio frequency signals transmitted at a plurality of times from each wheel;

determining rotation angles traveled by each wheel at the plurality of times;

identifying the locations of the wheels on the vehicle based on the phase shifts and the rotation angles.

determining first wheel angles based on the phase shifts and second wheel angles based on the rotation angles;

ranking the first wheel angles and second wheel angles in order to create pairs of wheel angles; and identifying the location of the wheels based on the ranking.

6. The method of claim 5, further comprising:

identifying a first period, in the range [T1, T1+t1] of a radio frequency reception level S1[T1, T1+t1] of the radio frequency signals;

identifying a second period, in the range [T2, T2+t2] of the radio frequency reception level S2[T2, T2+t2] of the radio frequency signals, wherein t1 and t2 represent one period of the radio frequency signals; and determining the phase shifts based on the first and second periods.

7. The method of claim 5, wherein the rotation angles are determined based on the speed traveled by each wheel.

8. The method of claim 7, wherein the speed traveled by each wheel is received from an antilock braking system of the vehicle.

9. A method of identifying the locations of wheels on a vehicle, comprising, for each of a plurality of wheels:

receiving a radio frequency signal having a periodic modulation at first and second times and determining a phase shift in the periodic modulation between the first and second times;

receiving a speed signal from a wheel speed sensor;

identifying the locations of the wheels on the vehicle based on the phase shifts and the speed signals;

ranking the phase shifts and wheel rotation angles in order to create pairs of wheel angles; and identifying the locations of the wheels based on the ranking.

10. The method of claim 9, further comprising:

for each of the plurality of wheels, receiving the speed signal at the first and second times and determining a wheel rotation angle based on the speed signals.

11. The method of claim 10, wherein the wheel speed sensor is associated with an antilock braking system.

12. The method of claim 9, wherein the periodic modulation is an amplitude modulation.

13. The method of claim 9, further comprising:

identifying a first period, in the range [T1, T1+t1] of a radio frequency reception level S1[T1, T1+t1] of the radio frequency signal;

identifying a second period, in the range [T2, T2+t2] of the radio frequency reception level S2[T2, T2+t2] of the radio frequency signal, wherein t1 and t2 represent one period of the radio frequency signal; and determining the phase shifts based on the first and second periods.

* * * * *